(12) United States Patent
Noda

(10) Patent No.: US 10,343,376 B2
(45) Date of Patent: Jul. 9, 2019

(54) GLASS RESIN LAMINATE

(71) Applicant: NIPPON ELECTRIC GLASS CO., LTD., Shiga (JP)

(72) Inventor: Takayuki Noda, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 156 days.

(21) Appl. No.: 15/533,719

(22) PCT Filed: Dec. 15, 2015

(86) PCT No.: PCT/JP2015/085073
§ 371 (c)(1),
(2) Date: Jun. 7, 2017

(87) PCT Pub. No.: WO2016/098769
PCT Pub. Date: Jun. 23, 2016

(65) Prior Publication Data
US 2017/0326843 A1 Nov. 16, 2017

(30) Foreign Application Priority Data
Dec. 19, 2014 (JP) .................. 2014-257335

(51) Int. Cl.
| | | |
|---|---|---|
| *B32B 17/10* | (2006.01) | |
| *B32B 7/02* | (2019.01) | |
| *B32B 7/12* | (2006.01) | |
| *B32B 17/06* | (2006.01) | |

(52) U.S. Cl.
CPC .......... *B32B 17/10036* (2013.01); *B32B 7/02* (2013.01); *B32B 7/12* (2013.01); *B32B 17/065* (2013.01); *B32B 17/10752* (2013.01); *B32B 17/10788* (2013.01); *B32B 2307/54* (2013.01); *B32B 2369/00* (2013.01)

(58) Field of Classification Search
None
See application file for complete search history.

(56) References Cited

U.S. PATENT DOCUMENTS

| | | | | |
|---|---|---|---|---|
| 2009/0312479 | A1* | 12/2009 | Ren .................... | C08L 69/00 524/451 |
| 2012/0128952 | A1 | 5/2012 | Miwa et al. | |
| 2012/0286649 | A1* | 11/2012 | Rajan .................. | H01L 51/0096 313/504 |
| 2016/0001027 | A1* | 1/2016 | Akervall ............. | A61M 16/049 128/862 |

FOREIGN PATENT DOCUMENTS

| | | |
|---|---|---|
| GB | 2051675 A * | 6/1980 |
| JP | 2012-25152 | 2/2012 |
| JP | 2014-12373 | 1/2014 |
| JP | 2014-65169 | 4/2014 |

OTHER PUBLICATIONS

Extended European Search Report dated Jul. 25, 2018 in European Application No. 15869974.4.
International Preliminary Report on Patentability dated Jun. 20, 2017 in International Application No. PCT/JP2015/085073.
International Search Report dated Mar. 1, 2016 in International Application No. PCT/JP2015/085073.

* cited by examiner

*Primary Examiner* — Robert T Butcher
(74) *Attorney, Agent, or Firm* — Wenderoth, Lind & Ponack, L.L.P.

(57) ABSTRACT

Provided is a glass resin laminate (1) obtained laminating glass sheets (5, 6) on both surfaces of a resin, plate (2) through intermediation of adhesive layers (3, 4) to integrate the plate and the sheets, in which an intermediate sheet (7) is interposed in the adhesive layer (3) on one surface side of the resin plate (2). In addition, on the side where the intermediate sheet (7) is interposed, the glass sheet (5) has a thickness of: from 0.01 mm to 1 mm, and the thickness of the adhesive layer (3) excluding the intermediate sheet (7) is smaller than the thickness of the resin plate (2). In addition, the intermediate sheet (7) has a tensile modulus larger than the tensile modulus of the adhesive layer (3).

4 Claims, 2 Drawing Sheets

GLASS RESIN LAMINATE

TECHNICAL FIELD

The present invention relates to a glass resin laminate obtained by laminating glass sheets on both surfaces of a resin plate through intermediation of adhesive layers to integrate the sheets and the plate.

BACKGROUND ART

A glass resin laminate obtained by laminating glass sheets on both surfaces of a resin plate through intermediation of adhesive layers to integrate the sheets and the plate has been frequently used in a wide variety of fields, such as cover members for various instruments and building materials, from the viewpoint of, for example, achieving both durability and a light weight.

In addition, in recent years, glass resin laminates using extremely thin glass sheets as their glass sheets have been proposed from the viewpoint of achieving a further weight reduction, and some of the laminates have been put into practical use (see, for example. Patent Literatures 1 to 3).

CITATION LIST

Patent Literature 1: JP 2012-25152 A
Patent Literature 2: JP 2014-1E373 A
Patent Literature 3: JP 2014-65169 A

SUMMARY OF INVENTION

Technical Problem

However, the fact is that a glass resin laminate using glass sheets still involves a problem in terms of strength because the application of local external impact may easily break the glass sheets.

In view of the fact, an object of the present invention is to securely suppress the breakage of glass sheets in a glass resin laminate using the glass sheets.

Solution to Problem

According to one embodiment of the present invention, which has been devised in order to achieve the above-mentioned object, there is provided a glass resin laminate, which is obtained by laminating glass sheets on both surfaces of a resin plate through intermediation of adhesive layers to integrate the resin plate and the glass sheets, wherein, on at least one surface side of the resin plate, the adhesive layer has interposed therein an intermediate sheet, the glass sheet has a thickness of from 0.01 mm to 1 mm, a thickness of the adhesive layer excluding the intermediate sheet is smaller than a thickness of the resin plate, and the intermediate sheet has a tensile modulus larger than a tensile modulus of the adhesive layer. Here, the term "thickness of the adhesive layer excluding the intermediate sheet" means the total thickness of the adhesive layer having interposed therein the intermediate sheet obtained by summing the respective thicknesses of adhesive layer portions positioned on both sides of the intermediate sheet in the adhesive layer.

With such construction, while the thickness (total thickness) of the adhesive layer having interposed therein the intermediate sheet is prevented from becoming unduly larger than that of the resin plate serving as a core material, even when local external impact is applied to the glass sheet on the side where the intermediate sheet is interposed, local deformation of the adhesive layer is prevented by the reinforcing effect of the intermediate sheet having a tensile modulus larger than that of the adhesive layer. As a result, the external impact applied to the glass sheet propagates through the entire surface of the adhesive layer to be absorbed by the entirety of the adhesive layer. Moreover, in such process for the absorption of the impact, local deformation hardly occurs also in the glass sheet on the adhesive layer. Therefore, the breakage of the glass sheet on the side where the intermediate sheet is interposed due to its local deformation caused by the impact can be securely suppressed.

In the above-mentioned construction, it is preferred that, on the side sphere the intermediate sheet is interposed, the thickness of the adhesive layer excluding the intermediate sheet be larger than the thickness of the glass sheet.

In such case, the glass sheet can more flexibly deform in the surface layer portion of the adhesive layer. Accordingly, when an expansion or contraction difference occurs between the resin plate and the glass sheet owing to, for example, an air temperature change, the glass sheet can freely deform on the adhesive layer that is relatively thick to absorb a stress caused by expansion or contraction.

In the above-mentioned construction, the intermediate sheet may be arranged in the adhesive layer to be closer to the glass sheet than to the resin plate.

In such case, the intermediate sheet is arranged at a position close to the outer surface of the laminate. Accordingly, for example, when the intermediate sheet is a design sheet (decorative sheet), there is an advantage in that it becomes easy to observe the pattern or color of the design sheet from the outside.

In the above-mentioned construction, the intermediate sheet may be arranged in the adhesive layer to be closer to the resin plate than to the glass sheet.

In such case, the intermediate sheet is arranged at a position close to the resin plate serving as a core material, and hence becomes distant from an outer surface side. Accordingly, for example, even when the intermediate sheet is liable to deteriorate with UV light, the deterioration of the intermediate sheet can be suppressed.

In the above-mentioned construction, it is preferred that, on each of both surface sides of the resin plate, the adhesive layer have interposed therein the intermediate sheet.

In such case, the breakage of the glass sheets can be suppressed on both surfaces of the glass resin laminate, and hence the applications of the glass resin laminate expand. That is, the glass resin laminate can be used without any problem even in an application where external impact may be applied to each of both surfaces of the laminate.

In the above-mentioned construction, it is preferred that the intermediate sheet comprise a resin sheet.

In such case, it becomes easy to add a desired function to the intermediate sheet or to perform a treatment, such as printing for imparting a design property thereto. In addition, dust generation at the time of the production of the glass resin laminate can be suppressed. Further, the adhesive property of the intermediate sheet with an adhesive constituting the adhesive layer can be improved.

Advantageous Effects of Invention

As described above, according to the glass resin laminate according to the present invention, the breakage of the glass sheets can be securely suppressed.

DESCRIPTION OF EMBODIMENTS

Embodiments of the present invention are described below with reference to the accompanying drawings.

First Embodiment

Figure 1:
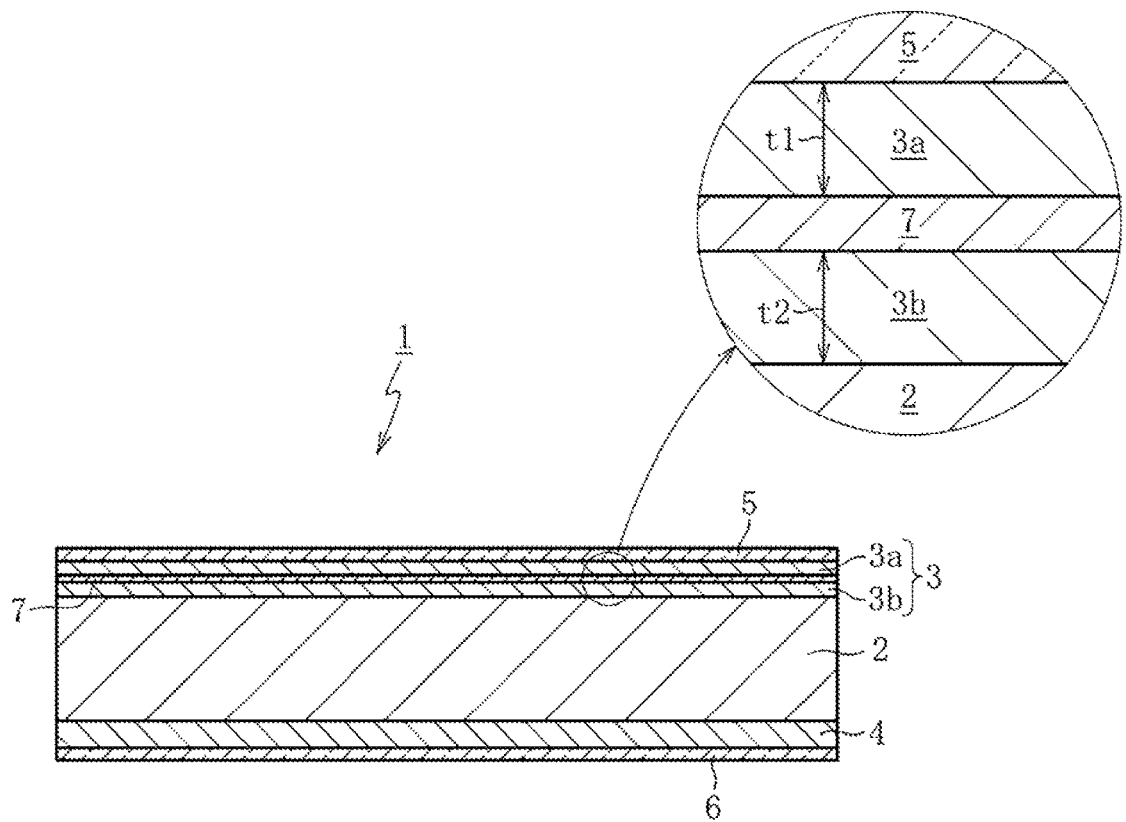
FIG. 1 is a sectional view of a glass resin laminate according to a first embodiment of the present invention.

As illustrated in FIG. 1, in a glass resin laminate 1 according to a first embodiment of the present invention, glass sheets 5 and 6 are laminated an both surfaces of a resin plate 2 through intermediation of adhesive layers 3 and 4 so that the sheets and the plate may be integrated. One intermediate sheet is interposed in the adhesive layer 3 on one surface side of the resin plate 2.

The thickness of the adhesive layer 3 excluding the intermediate sheet 7, i.e., the total sum of a thickness t1 of a first portion 3a of the adhesive layer 3 and a thickness t2 of a second portion 3b thereof illustrated in the figure in an enlarged manner is larger than the thickness of the glass sheet 5 and smaller than the thickness of the resin plate 2. That is, a relationship "thickness of resin plate 2>thickness of adhesive layer 3>thickness of glass sheet 5" is established.

In addition, the tensile modulus of the intermediate sheet 7 is larger than the tensile modulus of the adhesive layer 3. Here, the tensile modulus is measured in conformity with JIS K 7127.

In detail, the thickness of the resin plate 2 is preferably from 0.2 mm to 50 mm, more preferably from 0.5 mm to 20 mm, still more preferably from 1 mm to 15 mm.

The thickness of the adhesive layer 3 (total sum of the thickness t1 of the first portion 3a and the thickness t2 of the second portion 3b) is preferably from 0.025 mm to 2 mm, more preferably from 0.05 mm to 1.6 mm, still more preferably from 0.1 mm to 0.8 mm. In this embodiment, the thickness t1 of the first portion 3a and the thickness t2 of the second portion 3b are equal to each other, and the intermediate sheet 7 is interposed at a center position in the thickness direction of the adhesive layer 3.

The thickness of the glass sheet 5 is preferably from 0.01 mm to 1 mm, more preferably from 0.03 mm to 0.8 mm, still more preferably from 0.05 mm to 0.5 mm from the viewpoints of a strength and a light weight.

The thickness of the intermediate sheet 7 is preferably from 0.012 mm to 0.3 mm, more preferably from 0.038 mm to 0.2 mm, still more preferably from 0.05 mm to 0.1 mm in order that a reinforcing effect on the glass sheet 5 may be satisfied while an increase in total thickness of the glass resin laminate 1 is prevented. The thickness of the intermediate sheet 7 is preferably smaller than the thickness of the adhesive layer 3.

The tensile modulus of the intermediate sheet 7 is preferably from 500 MPa to 20,000 MPa, more preferably from 900 MPa to 10,000 MPa, still more preferably from 1,000 MPa to 5,000 MPa in order that the glass sheet 5 may be properly protected.

The tensile modulus of the adhesive layer 3 is preferably from 0.1 MPa to 300 MPa, more preferably from 1 MPa to 200 MPa, still more preferably from 5 MPa to 100 MPa. The adhesive layer 3 is preferably a stretchable layer, and as its thickness becomes larger, the layer can absorb a stretching difference between the resin plate 2 and the glass sheet 5 due to their thermal expansion difference to a larger extent.

A polycarbonate, a polyacrylic resin, a PET, a COP, a PVC, or the like is used as the resin plate 2. The resin plate 2 may be transparent, or may be opaque.

The glass sheet 5 is preferably a silicate glass or a silica glass, more preferably a borosilicate glass, a soda-lime glass, or an aluminosilicate glass, still more preferably a alkali-free glass. The use of the alkali-free glass improves the transparency of the sheet, and can prevent its deterioration due to the elution of an alkali. A sheet formed by a down-draw method, such as an overflow down-draw method, a slot down-draw method, or a redraw down-draw method, or a float method may be utilized as the glass sheet 5.

The adhesive layer 3 is preferably transparent. A double-sided pressure-sensitive adhesive sheet, a thermoplastic adhesive sheet, a thermally crosslinkable adhesive sheet, an energy-curable liquid adhesive, or the like may be used as the adhesive layer 3. In detail, for example, an optically transparent pressure-sensitive adhesive sheet, an EVA, a TPU, a COP, an acrylic thermoplastic adhesive sheet, a UV-curable adhesive, a thermosetting adhesive, or a normal temperature-curable adhesive may be used as the adhesive layer 3.

The adhesive layer 3 may have a UV-shielding function. With this, the resin plate 2 can be protected from UV light. In addition, a sheet that is liable to deteriorate with UV light can foe used as the intermediate sheet 7. With regard to a method of imparting the UV-shielding function to the adhesive layer 3, a UV-absorbing characteristic derived from a material for the adhesive layer 3 may be utilized, or a UV absorber may be separately added.

The intermediate sheet 7 may be transparent, or may be opaque. In an application where the intermediate sheet 7 is not required to have transparency, the resin plate 2 may also be opaque.

The intermediate sheet 7 is preferably a resin. A polyester, a polyolefin, a polycarbonate, a polyacrylic resin, or the like is used as the resin. When transparency or smoothness is needed, a FET is preferably used as the intermediate sheet 7, and when heat resistance or a light-shielding property is needed, a polypropylene, a polycarbonate, or the like is preferably used as the intermediate sheet 7. A material for the intermediate sheet 7 may be the same material as that for the resin plate 2 as long as the tensile modulus of the sheet is larger than that of the adhesive layer 3. The tensile moduli of a polycarbonate and a polyacrylic resin are from 2,000 MPa to 3,000 MPa, and hence these materials may be used for both the resin plate 2 and the intermediate sheet 7 while their thicknesses are changed.

The intermediate sheet may be paper formed of pulp or the like. The paper has become widespread for printing or figure printing, and is suitable for the purpose of posting information or displaying a figure. In addition, the paper generally has semipermeability, and hence a light-adjusting function of adjusting the quantity of transmitted light that passes the glass resin laminate 1 can be imparted to the sheet. The glass resin laminate 1 using the paper as the intermediate sheet 7 can be suitably used as a building material, such as a partition, a stair, or a panel for the wall surface of a veranda, by exploiting such characteristic. In particular, when the intermediate sheet 7 is Japanese paper, in addition to the light-adjusting function, there is an advantage in that the sheet has a design property because a unique atmosphere can be produced with transmitted light from a heterogeneous structure derived from the Japanese paper. In addition, a pattern, such as a flying dragon, may be applied to the Japanese paper from the viewpoint of improving the design property.

The intermediate sheet 7 may be a composite sheet obtained by compositing a paper raw material, with a resin, such as a polyester. In the case where the composite sheet is used, there is an advantage in that the sheet hardly breaks and hence dust generation hardly occurs at the time of the production of the glass resin laminate 1. In addition, in this case, there is also an advantage in that an adhesive property between the intermediate sheet 7 and the adhesive layer 3 is improved.

The intermediate sheet 7 may be a sheet obtained by printing a pattern or the like on a substrate, such as a resin sheet. In this case, paper quality can be reproduced by printing even when no paper is used, or a design property that cannot be represented with paper can be imparted to the sheet. A nonwoven fabric may be used as the intermediate sheet 7.

In the case where a design property is imparted to the intermediate sheet 7, a sheet obtained by printing a wood pattern or a metallic pattern on a substrate, such as a resin sheet, may be used. In this case, the glass resin laminate 1 can be suitably used as a building material, furniture, or a cover member for an instrument. When the wood pattern or the metallic pattern is printed, a sheet having impermeability, such as a polypropylene, is preferably used as the substrate. When the intermediate sheet 7 having printed thereon the metallic pattern is used, metallic luster can be reproduced with the luster of the glass sheet 5. Examples of the metallic printing pattern include the hairline finish of stainless steel and the polished surface of aluminum.

In addition, the intermediate sheet 7 may be monochromatic. For example, when the intermediate sheet 7 is black, the sheet can provide the texture of a piano black color in combination with the glass sheet 5, and when the intermediate sheet 7 is white, the sheet can reproduce a shiny and clear white color in combination with the glass sheet 5.

The intermediate sheet 7 may have a physical function instead of a design property or in addition to the design property. For example, the intermediate sheet 7 may have an infrared light-shielding function. In this case, the glass resin laminate 1 can be suitably used as a heat-shielding window or a heat-shielding wall. A method of imparting the infrared light-shielding function to the intermediate sheet 7 is, for example, as follows: a resin sheet, such as a PET, is used as a substrate, and a film configured to absorb or reflect infrared light is formed on the surface of the substrate.

The intermediate sheet 7 may have an electromagnetic wave-shielding function. In this case, the glass resin laminate 1 can be suitably used as a window or a wall configured to shield an electromagnetic wave harmful to a human body or an electromagnetic wave unnecessary in its environment. Specifically, the glass resin laminate 1 may be utilized in medical facilities. A method of imparting the electromagnetic wave-shielding function to the intermediate sheet 7 is, for example, as follows: a resin sheet, such as a PET, is used as a substrate, and a transparent conductive film, such as an ITO film or a copper film, is formed on the surface of the substrate.

The intermediate sheet may have semipermeability for visible light. In this case, the glass resin laminate 1 can be suitably used as a cover member for various instruments or a partition. A method of imparting the semipermeability to the intermediate sheet 7 is, for example, the roughening of the surface of a resin sheet, such as a PET, by a sandblast treatment, a chemical treatment, or the like in addition to the use of paper or a material similar to paper as the intermediate sheet 7 as described above. When such treatment is performed, the light permeability of the sheet can be adjusted by changing the roughness of the surface, or applying the roughening treatment to one surface, or each of both surfaces, of the sheet.

The intermediate sheet 7 may have a function of reflecting visible light. In this case, the glass resin laminate 1 can foe used as a safe and lightweight mirror. A method of imparting the reflecting function is, for example, the formation of a reflective film on the surface of a substrate, such as a resin sheet. A range in which the reflective film is formed may be the entirety of the surface, or may be part of the surface. In addition, the laminate may be turned into a half mirror by imparting semipermeability to the reflective film.

Here, various characteristics of the adhesive layer 4 on the other surface side of the resin plate 2, such as a thickness, a material, and a tensile modulus, may be identical to or different from those of the adhesive layer 3 on one surface side of the resin plate 2 that have already been described. In addition, various characteristics of the glass sheet 6 on the other surface side of the resin plate 2, such as a thickness and a material, may also be identical to or different from those of the glass sheet 5 on one surface side of the resin plate 2 that have already been described. In this embodiment, the various characteristics of the adhesive layer 4 and the glass sheet 6 are identical to the various characteristics of the adhesive layer 3 and the glass sheet 5 that have already been described.

In the glass resin laminate 1 constituted as described above, a magnitude relationship among the respective thicknesses of the resin plate 2, the adhesive layer 3, and the glass sheet 5, and a magnitude relationship between the respective tensile moduli of the adhesive layer 3 and the intermediate sheet 7 are controlled. Thus, a moderate cushioning property can be imparted to the adhesive layer 3 while the thickness (total thickness) of the adhesive layer 3 is prevented from becoming unduly larger than that of the resin plate 2 serving as a core material. In addition, even when local external impact is applied to the glass sheet 5, local deformation of the adhesive layer 3 is prevented by the reinforcing effect of the intermediate sheet 7 having a tensile modulus larger than that of the adhesive layer 3. As a result, the external impact applied to the glass sheet 5 propagates through the entire surface of the adhesive layer 3 to be absorbed by the entirety of the adhesive layer 3. Moreover, in such process for the absorption of the impact, local deformation hardly occurs also in the glass sheet 5 on the adhesive layer 3. Therefore, the breakage of the glass sheet 5 due to its local deformation can be securely suppressed. Because of the foregoing, the glass resin laminate 1 can be suitably used as, for example, a building material or a cover member for various instruments.

Second Embodiment

Figure 2:
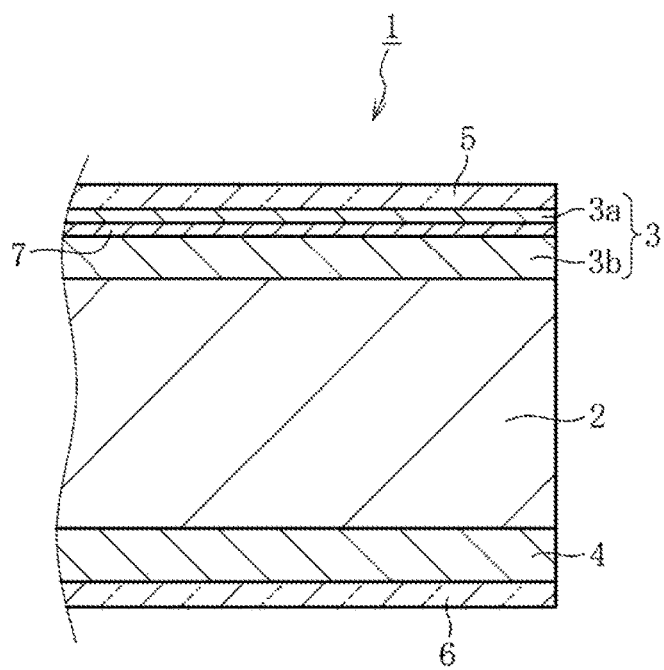
FIG. 2 is an enlarged sectional view for illustrating the construction of a main part of a glass resin laminate according to a second embodiment of the present invention.

As illustrated in FIG. 2, the glass resin laminate 1 according to a second embodiment of the present invention differs from the glass resin laminate 1 according to the first embodiment in that the intermediate sheet 7 is arranged in the adhesive layer 3 so as to be closer to the glass sheet 5 (outer surface) than to the resin plate 2. That is, the thickness of the first portion 3a of the adhesive layer 3 is smaller than the thickness of the second portion 3b. In such case, for example, when the intermediate sheet 7 is a design sheet, it becomes easy to observe the pattern, color, or the like of the design sheet from the outside, and hence the original design property of the intermediate sheet 7 can be exploited.

Here, in the case where the thickness of the first portion 3a and the thickness of the second portion 3b are made different from each other as described above, an adhesive sheet is preferably used as an adhesive constituting the adhesive layer 3. In this case, the position of the intermediate sheet 7 in the thickness direction of the adhesive layer 3 can be adjusted merely by changing the thicknesses and lamination number of the adhesive sheets constituting the first portion 3a and the second portion 3b.

Third Embodiment

Figure 3:
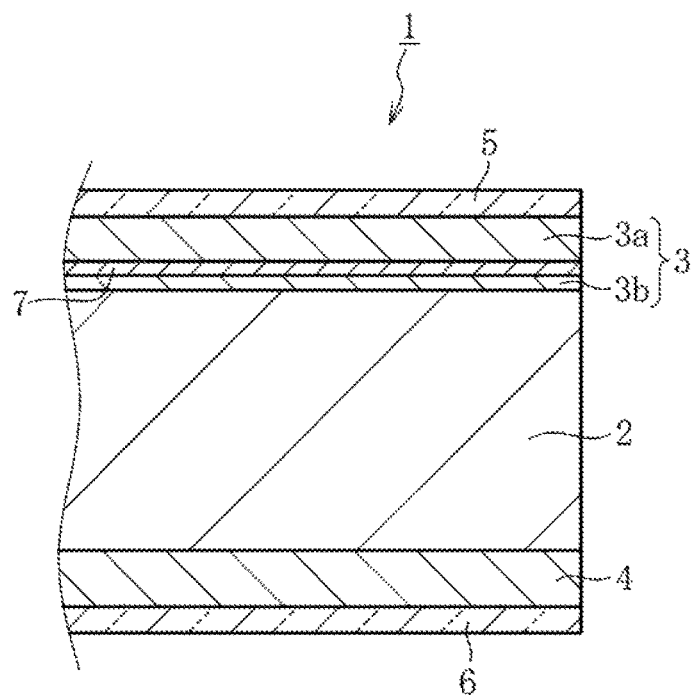
FIG. 3 is an enlarged sectional view for illustrating the construction of a main part of a glass resin laminate according to a third embodiment of the present invention.

As illustrated in FIG. 3, the glass resin laminate 1 according to a third embodiment of the present invention differs from the glass resin laminates 1 according to the first and second embodiments in that the intermediate sheet 7 is arranged in the adhesive layer 3 so as to be closer to the resin plate 2 than to the glass sheet 5. That is, the thickness of the first portion 3a of the adhesive layer 3 is larger than the thickness of the second portion 3b. In such case, the intermediate sheet 7 becomes distant from the glass sheet 5, and hence when the intermediate sheet 7 is liable to deteriorate with UV light, the deterioration of the intermediate sheet 7 can be suppressed. The adhesive layer 3 also preferably has a UV-shielding function from the viewpoint of suppressing the deterioration with UV light.

Fourth Embodiment

Figure 4:
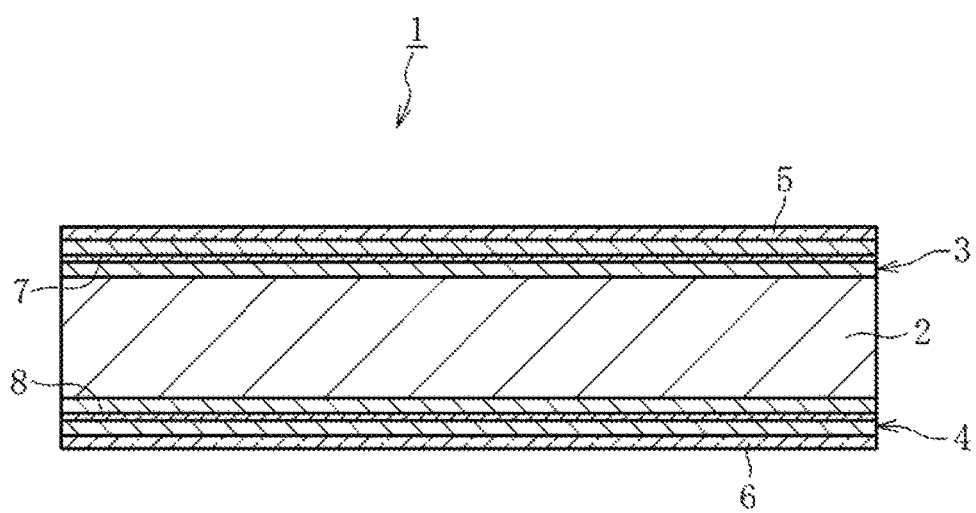
FIG. 4 is a sectional view of a glass resin laminate according to a fourth embodiment of the present invention.

As illustrated in FIG. 4, the glass resin laminate 1 according to a fourth embodiment of the present invention differs from the glass resin laminates 1 according to the first to third embodiments in that the intermediate sheet 7 and an intermediate sheet 8 are interposed in the adhesive layers 3 and 4 on both surface sides of the resin plate 2, respectively. In such case, the breakage of the glass sheets 5 and 6 constituting both outer surfaces of the glass resin laminate 1 can be securely suppressed. That is, even when external impact is applied from any one of the front and rear surface sides of the glass resin laminate 1, the glass sheets 5 and 6 hardly break, and hence applications to which the laminate is applicable can be expanded.

The intermediate sheets 7 and 8 may be sheets identical in kind to each other, or may be different kinds of sheets. For example, when a function of reflecting visible light is imparted to each of the intermediate sheets 7 and 8, the glass resin laminate 1 serves as a mirror that can be utilized from both surfaces. In addition, when patterns of the same kind, such as a wood pattern and a metallic pattern, are applied to the respective intermediate sheets 7 and 8, the glass resin laminate 1 appears to be one wood plate or metal plate. Further, when a wood pattern or a metallic pattern is applied to the one intermediate sheet 7, and a pattern except the wood pattern or the metallic pattern is applied to the other intermediate sheet 7, a new design property that cannot be represented with one wood plate or metal plate can be exhibited.

The present invention is not limited to the above-mentioned embodiments, and can be carried out according to various embodiments. For example, the case where the thickness of the adhesive layer (total sum of the thickness of the first portion and the thickness of the second portion) is larger than the thicknesses of the glass sheets has been described in each of the above-mentioned embodiments, but the thickness of the adhesive layer may be smaller than the thicknesses of the glass sheets, or may be equal thereto.

In addition, the case where one intermediate sheet is interposed in the adhesive layer has been described in each of the above-mentioned embodiments, but a plurality of intermediate sheets may be interposed in the adhesive layer.

In addition, a flat-shaped glass resin laminate has been described in each of the above-mentioned embodiments, but the glass resin laminate may be of a curved surface shape.

EXAMPLE 1

(1) Resin Plate

Material: polycarbonate
Thickness: 4 mm (2) Adhesive Layer

Material: EVA
Thickness: 0.4 mm
Tensile modulus: 30 MPa (3) Glass Sheet

Material: alkali-free glass
Thickness: 0.2 mm (4) Intermediate Sheet

Material: A composite sheet formed of 75% of pulp and 25% of a polyester, the sheet having applied thereto a Japanese paper-like (flying dragon pattern) print
Thickness: 0.2 mm
Tensile modulus: 4,200 MPa (5) Structure and Application of Glass Resin Laminate A glass resin laminate was of a structure in which an intermediate sheet was interposed at a center position in the thickness direction of an adhesive layer positioned on one surface side of a resin plate.

The glass resin laminate was produced so as to be of a size measuring 960 mm by 1,600 mm. In addition, three of the glass resin laminates thus produced were installed in parallel to be utilized as indoor partitions.

Here, the strength test of the glass resin laminate thus constituted was performed. The strength test was performed as follows: under a state in which the glass resin laminate was mounted on a flat table, a hammer was swung down from a predetermined height (about 300 mm) on the glass sheet of the glass resin laminate, and the presence or absence of the breakage of the glass sheet was inspected. As a result, the breakage of the glass sheet of the glass resin laminate was not observed. Such strength test was performed also for each of Examples 2 to 10 to be described later, but the breakage of a glass sheet was also not observed.

EXAMPLE 2

(1) Resin Plate

Material: polycarbonate
Thickness: 4 mm (2) Adhesive Layer

Material: EVA
Thickness: 0.4 mm
Tensile modulus: 30 MPa (3) Glass Sheet

Material: alkali-free glass
Thickness: 0.2 mm (4) Intermediate Sheet

Material: A PET sheet having applied thereto a Japanese paper-like print
Thickness: 0.05 mm
Tensile modulus: 3,500 MPa (5) Structure and Application of Glass Resin Laminate A glass resin laminate was of a structure in which an intermediate sheet was interposed at a center position in the thickness direction of an adhesive layer positioned on one surface side of a resin plate.

As in Example 1, the glass resin laminate was produced so as to be of a size measuring 960 mm by 1,600 mm. In addition, three of the glass resin laminates thus produced were installed in parallel to be utilized as indoor partitions.

The Japanese paper-like print was partially applied to the transparent PET sheet, and hence the glass resin laminate had permeability higher than that of the glass resin laminate of Example 1, and was finished to be a laminate causing no feeling of entrapment when used as a partition.

EXAMPLE 3

(1) Resin Plate

Material: polycarbonate
Thickness: 5 mm (2) Adhesive Layer

Material: EVA
Thickness: 0.4 mm
Tensile modulus: 17 MPa (3) Glass Sheet

Material: alkali-free glass
Thickness: 0.2 mm (4) Intermediate Sheet

Material: A PET sheet having both surfaces subjected to sandblast treatment
Thickness: 0.075 mm
Tensile modulus: 3,900 MPa (5) Structure and Application of Glass Resin Laminate A glass resin laminate was of a structure in which an intermediate sheet was interposed in an adhesive layer positioned on one surface side of a resin plate so as to be closer to the resin plate (thickness of the first portion (glass sheet side) of the adhesive layer: 0.25 mm, thickness of the second portion (resin plate side) of the adhesive layer: 0.15 mm).

The glass resin laminate was produced so as to be of a size measuring 1,000 mm by 1,200 mm. In addition, seven of the glass resin laminates thus produced were installed in parallel to be utilized as panels for the wall surface of a veranda.

The glass resin laminate was of a frosted glass type by virtue of the intermediate sheet subjected to the sandblasting, and hence the laminate was able to reduce visibility from the outside while maintaining moderate lighting from a veranda wall.

EXAMPLE 4

(1) Resin Plate

Material: polycarbonate
Thickness: 3 mm (2) Adhesive Layer

Material: EVA
Thickness: 0.6 mm
Tensile modulus: 30 MPa (3) Glass Sheet

Material: alkali-free glass
Thickness: 0.2 mm (4) Intermediate Sheet

Material: A polypropylene sheet having applied thereto a wood pattern print
Thickness: 0.2 mm
Tensile modulus: 2,000 MPa (5) Structure and Application of Glass Resin Laminate A glass resin laminate was of a structure in which an intermediate sheet was interposed in an adhesive layer positioned on one surface side of a resin plate so as to be closer to a glass sheet (thickness of the first portion of the adhesive layer: 0.2 mm, thickness of the second portion of the adhesive layer: 0.4 mm).

The glass resin laminate was produced so as to be of a size measuring 960 mm by 1,800 mm. The glass resin laminate was embedded in an indoor wall to be utilized as a building material.

EXAMPLE 5

(1) Resin Plate

Material: polycarbonate
Thickness: 5 mm (2) Adhesive Layer

Material: EVA
Thickness: 0.4 mm
Tensile modulus: 30 MPa (3) Glass Sheet

Material: alkali-free glass
Thickness: 0.2 mm (4) Intermediate Sheet

Material: A polypropylene sheet having applied thereto a wood pattern print
Thickness: 0.2 mm
Tensile modulus: 2,000 MPa (5) Structure and Application of Glass Resin Laminate A glass resin laminate was of a structure in which intermediate sheets were interposed in respective adhesive layers positioned on both surface sides of a resin plate so as to be closer to glass sheets (thickness of the first portion of the adhesive layer: 0.15 mm, thickness of the second portion of the adhesive layer: 0.25 mm).

The glass resin laminate was produced so as to be of a size measuring 960 mm by 1,600 mm. In addition, three of the glass resin laminates thus produced were installed in parallel to be utilized as indoor partitions.

Both surfaces of the glass resin laminate had wood patterns of the same kind, and hence the laminate provided a texture like one plate.

EXAMPLE 6

(1) Resin Plate

Material: polycarbonate
Thickness: 3 mm (2) Adhesive Layer

Material: EVA
Thickness: 0.4 mm
Tensile modulus: 11 MPa (3) Glass Sheet

Material: alkali-free glass
Thickness: 0.3 mm (4) Intermediate Sheet

Material: A polypropylene sheet having applied thereto a stainless-steel hairline-like print
Thickness: 0.2 mm
Tensile modulus: 1,500 MPa (5) Structure and Application of Glass Resin Laminate A glass resin laminate was of a structure in which an intermediate sheet was interposed in an adhesive layer positioned on one surface side of a resin plate so as to be closer to a glass sheet (thickness of the first portion of the adhesive layer: 0.15 mm, thickness of the second portion of the adhesive layer: 0.25 mm).

The glass resin laminate was produced so as to be of a size measuring 1,000 mm by 1,150 mm, and was utilized as a cover member for a mechanical device.

EXAMPLE 7

(1) Resin Plate

Material: polycarbonate
Thickness: 4 mm (2) Adhesive Layer

Material: EVA
Thickness: 0.4 mm
Tensile modulus: 11 MPa (3) Glass Sheet

Material: alkali-free glass
Thickness: 0.3 mm (4) Intermediate Sheet

Material: A PET sheet having an infrared light-absorbing surface coat
Thickness: 0.05 mm
Tensile modulus: 3,900 MPa (5) Structure and Application of Glass Resin Laminate A glass resin laminate was of a structure in which an intermediate sheet was interposed at a center position in the thickness direction of an adhesive layer positioned on one surface side of a resin plate.

The glass resin laminate was produced so as to be of a size measuring 830 mm by 1,450 mm, and was utilized as a protective cover for the screen of a digital signage.

In the signage installed outdoors, the laminate was able to protect the screen of a liquid crystal display from the heat of solar radiation.

EXAMPLE 8

(1) Resin Plate

Material: polycarbonate
Thickness: 5 mm (2) Adhesive Layer

Material: TPU
Thickness: 0.4 mm
Tensile modulus: 60 MPa (3) Glass Sheet

Material: alkali-free glass
Thickness: 0.2 mm

(4) Intermediate Sheet

Material: & PET sheet having an infrared light-reflecting surface coat
Thickness: 0.05 mm
Tensile modulus: 3,900 MPa

(5) Structure and Application of Glass Resin Laminate

A glass resin laminate was of a structure in which an intermediate sheet was interposed at a center position in the thickness direction of an adhesive layer positioned on one surface side of a resin plate.

The glass resin laminate was produced so as to be of a size measuring 790 mm by 840 mm, and was utilized as a heat-shielding window for a building.

EXAMPLE 9

(1) Resin Plate

Material: polycarbonate
Thickness: 4 mm

(2) Adhesive Layer

Material: EVA
Thickness: 0.4 mm
Tensile modulus: 30 MPa

(3) Glass Sheet

Material: alkali-free glass
Thickness: 0.2 mm

(4) Intermediate Sheet

Material: A PET sheet having an electromagnetic wave-shielding function imparted thereto through formation of an ITO film thereon
Thickness: 0.05 mm
Tensile modulus: 4,200 MPa

(5) Structure and Application of Glass Resin Laminate

A glass resin laminate was of a structure in which an intermediate sheet was interposed at a center position in the thickness direction of an adhesive layer positioned on one surface side of a resin plate.

The glass resin laminate was produced so as to be of a size measuring 450 mm by 790 mm, and was utilized as a window for the door of a treatment room of a hospital.

The laminate was able to prevent an electromagnetic wave emitted from a portable information terminal, the wave having a risk of adversely affecting an instrument in the treatment room, from entering the room through the window.

EXAMPLE 10

(1) Resin Plate

Material: polycarbonate
Thickness: 8 mm

(2) Adhesive Layer

Material: EVA
Thickness: 0.4 mm
Tensile modulus: 30 MPa

(3) Glass Sheet

Material: alkali-free glass
Thickness: 0.3 mm

(4) Intermediate Sheet

Material: A PET sheet having a half mirror formed on the entire surface thereof
Thickness: 0.1 mm
Tensile modulus: 3,000 MPa

(5) Structure and Application of Glass Resin Laminate

A glass resin laminate was of a structure in which an intermediate sheet was interposed at a center position in the thickness direction of an adhesive layer positioned on one surface side of a resin plate.

The glass resin laminate was produced so as to be of a size measuring 300 mm by 1,500 mm, and was utilized by being incorporated into the window of an entrance.

The laminate was able to be caused to function as a crime-preventing window by keeping an indoor side darker than an outdoor side through the effect of the half mirror.

REFERENCE SIGNS LIST 1 glass resin laminate
2 resin plate
3, 4 adhesive layer
5, 6 glass sheet
7, 3 intermediate sheet

The invention claimed is:
1. A glass resin laminate, comprising:
a resin plate;
a first glass sheet disposed on a first surface side of the resin plate;
a second glass sheet disposed on a second surface side of the resin plate;
a first intermediate sheet disposed between the resin plate and the first glass sheet a first adhesive layer disposed between the first glass sheet and the first intermediate sheet; and
a second adhesive layer disposed between the resin plate and the first intermediate sheet,
wherein:
the first glass sheet has a thickness of from 0.01 mm to 1 mm,
a total sum of a thickness of the first adhesive layer and a thickness of the second adhesive layer excluding the first intermediate sheet is smaller than a thickness of the resin plate,
a thickness of the first adhesive layer is larger than a thickness of the second adhesive layer such that the first intermediate sheet is arranged to be closer to the resin plate than to the first glass sheet, and
the first intermediate sheet has a tensile modulus larger than a tensile modulus of the first adhesive layer and the second adhesive layer.

2. The glass resin laminate according to claim 1, wherein, the total sum of the thickness of the first adhesive layer and the thickness of the second adhesive layer excluding the first intermediate sheet is larger than the thickness of the glass sheet.

3. The glass resin laminate according to claim 1, further comprising:
- a second intermediate sheet disposed between the resin plate and the second glass sheet;
- a third adhesive layer disposed between the second glass sheet and the second intermediate sheet; and
- a fourth adhesive layer disposed between the resin plate and the second intermediate sheet, wherein:
- the second glass sheet has a thickness of from 0.01 mm to 1 mm,
- a total sum of a thickness of the third adhesive layer and a thickness of the fourth adhesive layer excluding the second intermediate sheet is smaller than a thickness of the resin plate,
- a thickness of the third adhesive layer is larger than a thickness of the fourth adhesive layer such that the second intermediate sheet is arranged to be closer to the resin plate than to the second glass sheet, and
- the second intermediate sheet has a tensile modulus larger than a tensile modulus of the third adhesive layer and the forth adhesive layer.

4. The glass resin laminate according to claim 1, wherein the first intermediate sheet comprises a resin sheet.

* * * * *